United States Patent [19]

Smits et al.

[11] Patent Number: 4,945,119
[45] Date of Patent: Jul. 31, 1990

[54] FOAMING SYSTEM FOR RIGID URETHANE AND ISOCYANURATE FOAMS

[75] Inventors: Guide F. Smits, Wijengem, Belgium; Henri J. M. Grünbauer, Oostburg, Netherlands

[73] Assignee: The Dow Chemical Company, Midland, Mich.

[21] Appl. No.: 350,184

[22] Filed: May 10, 1989

[51] Int. Cl.$^5$ .............................................. C08G 18/14
[52] U.S. Cl. ................................. 521/131; 252/182.15; 252/182.24
[58] Field of Search .................... 521/131; 252/182.15, 252/182.24

[56] References Cited

U.S. PATENT DOCUMENTS

| | | | |
|---|---|---|---|
| 3,391,093 | 7/1968 | Frost | 260/2.5 |
| 3,745,203 | 7/1973 | Harper | 264/18 |
| 4,055,521 | 10/1977 | Taub et al. | 260/2.5 |
| 4,177,332 | 12/1979 | Mitschke et al. | 521/98 |
| 4,636,529 | 1/1987 | Crooker . | |

OTHER PUBLICATIONS

Derwent Abstract of J 63-265,936-A (88-356,376/50).
Derwent Abstract of J 60-212,481-A (85-306,755/49).

*Primary Examiner*—Maurice J. Welsh

[57] ABSTRACT

This invention relates to rigid closed-celled polyisocyanate-based foams exhibiting improved dimensional stability and a process for their preparation. In particular, it relates to foams containing within their cells, when initially prepared, a gas mixture comprising theoretically from about 5 to 70 mole percent carbon dioxide and from about 40 to about 95 mole percent of an organic compound mixture.

The organic compound mixture itself, comprises (a) from 40 to 95 mole percent of an organic compound having a boiling point greater than or equal to about 283K, and (b) from 5 to 60 mole percent of an organic compound having a boiling point equal to or less than about 266K. Halocarbons are the preferred organic compounds for components (a) and (b).

29 Claims, No Drawings

FOAMING SYSTEM FOR RIGID URETHANE AND ISOCYANURATE FOAMS

BACKGROUND OF THE INVENTION

This invention relates to rigid, closed-celled polyisocyanate-based foams, particularly polyurethane, polyurethane-isocyanurate and polyurethane-urea foams prepared using halocarbon blowing agents.

It is well-known to prepare such polyurethane foams by reacting an organic polyisocyanate (including diisocyanates) with an active hydrogen-containing compound in the presence of a blowing agent or agents. Generally speaking, such blowing agents are volatile organic compounds which are liquids at room temperature. The polymerization reaction between the active hydrogen-containing compound and the polyisocyanate giving a polyurethane is exothermic as is the trimerization reaction of isocyanate giving an isocyanurate polymer. The reaction exotherm is sufficient to vaporize the blowing agent, which then becomes encapsulated in the liquid phase of the polymerizing reaction mixture resulting in the formation of cells. The formation of cells causes the reaction mixture to expand and form a foam which subsequently cures to become a rigid closed-celled polyurethane foam.

A problem frequently encountered is that of preventing an unacceptable degree of shrinkage of partially cured foam during the aging or curing period following manufacture. A further problem often encountered in cured foams, especially in applications where polyurethane foam may be exposed to subzero temperatures, below 0° C., for extended periods of time, is shrinkage or dimensional stability.

Such shrinkage or poor dimensional stability is frequently observed either where blowing agents used to impart the cellular structure to the foam have a high diffusion rate through the urethane polymer such as, for example, carbon dioxide. Or where the blowing agents employed have atmospheric boiling points such that when foams containing these blowing agents are subjected for prolonged periods to low temperatures, the blowing agent condenses.

During the aging or curing period following the manufacture of the foam, the blowing agent employed depending on its permeability and diffusibility through the polymer may gradually diffuse out of the cells. Loss of blowing agent from the cells can eventually lead to shrinkage and poor dimensional stability of the foam. The condensation of blowing agent leads to greatly reduced internal cell pressures and eventually resulting in shrinkage and/or poor dimensional stability of the foam. A further disadvantage of having condensed blowing agent present can be a potentially harmful effect for any polymer or other plastic material present. The polystyrene inner liner used in the production of some refrigeration units can be attacked by the condensed blowing agent.

The shrinkage and poor dimensional stability of some polyurethane foams used for cold-insulation purposes may be controlled to an extent by for example increasing the foam density.

It would therefore be desirable to provide a process for the manufacture of polyurethane foams which have reduced susceptibility to shrinkage and improved dimensional stability. At the same time, it would be an additional advantage if such a process could provide for a reduction or elimination of the commercial dependency on especially "hard" chlorofluorocarbon (CFC) blowing agents. The "hard" CFC blowing agents are those compounds in which all hydrogens of the carbon backbone have been replaced by a halogen, normally fluorine and chlorine, in contrast to "soft" CFCs which have at least one hydrogen atom remaining on the carbon backbone. Such "hard" CFCs are suspected of destroying the earth's protective ozone layer by migrating up through the troposphere to the stratosphere and participating indirectly or directly in the chemical reactions of ozone.

Summary of the Invention

This invention accomplishes an improvement in dimensional stability of polyurethane foams. In a preferred embodiment at the same time a significantly lower dependency on the use of "hard" CFC blowing agents can be obtained through use of "soft" CFC blowing agents.

In one aspect, this invention is a process for preparing a rigid closed-celled polyisocyanate-based foam by reacting at least one organic polyisocyanate with at least one active hydrogen-containing compound in the presence of a blowing agent composition characterized in that the composition comprises:

(a) from about 40 to about 95 mole percent based on components (a) and (b) of at least one organic compound having a boiling point of at least about 283K, and (b) from about 5 to about 60 mole percent based on components (a) and (b) of at least one organic compound having a boiling point less than or equal to about 266K, and wherein the ratio of said boiling point of a component (a) to a component (b) is from about 1.06:1 to about 1.20:1 and wherein said composition is substantially free of any organic compound having a boiling point of at least 338K.

In a second aspect, this invention is a process for preparing a rigid closed-celled polyisocyanate-based foam by reacting at least one organic polyisocyanate with at least one active hydrogen-containing compound in the presence of a blowing agent composition characterized in that the composition comprises:

(a) from about 40 to about 95 mole percent based on components (a) and (b) of one or more compounds selected from the group consisting of trichlorofluoromethane (R-11), trichloromethane (R-20), diohlorofluoromethane (R-21), bromodichlorofluoromethane (R-11B1), dibromodifluoromethane (R-12B2), bromochlorofluoromethane (R-21B1), bromofluoromethane (R-31B1), dichloromethane (R-30), trifluorotrichloroethane (R-113), dichlorotrifluoroethane (R-123), dichlorodifluoroethane (R-132b), trifluorochloroethane (R-133), fluorodichloroethane (R-141b), and difluoroethane (R-152); and (b) from about 5 to about 60 mole percent based on components (a) and (b) of one or more compounds selected from the group consisting of chlorofluoromethane (R-31), bromochlorodifluoromethane (R-12B1), bromodifluoromethane (R-22B1), chloropentafluoroethane (R-115), chlorotetrafluoroethane (R-124 or isomer R-124a), tetrafluoroethane (R-134 or isomer R-134a), chlorodifluoroethane (R-142b), trifluoroethane (R-143), difluoroethane (R-152a), fluoroethane (R-161), hexafluorocyclopropane (C-216) and octafluorocyclobutane (C-318), and wherein the said composition is substantially free of any organic compound having a boiling point of at least 338K.

In a third aspect, this invention is a composition comprising a blend of at least one active hydrogen-containing compound and from about 1 to about 30 weight percent of total weight of the blend of a blowing agent composition comprising:

(a) from about 40 to about 95 mole percent based on components (a) and (b) of at least one organic compound having a boiling point of at least about 283K, and (b) from about 5 to about 60 mole percent based on components (a) and (b) of at least one organic compound having a boiling point less than or equal to about 266K, and wherein the ratio of said boiling point of a component (a) to a component (b) is from about 1.06:1 to about 1.20:1 and wherein said composition is substantially free of any organic compound having a boiling point of at least 338K.

In a fourth aspect, this invention is a blown, closed-celled polyisocyanate-based foam containing in its cells a gaseous mixture comprising:

(a) from about 30 to about 95 mole percent based on component (a) and component (b) of a mixture comprising:
  (1) from about 40 to about 95 mole percent based on components (1) and (2) of at least one organic compound having a boiling point of at least about 283K, and
  (2) from about 5 to about 60 mole percent based on components (1) and (2) of at least one organic compound having a boiling point less than or equal to about 272K, and wherein the ratio of said boiling points of component (1) to component (2) is from about 1.06:1 to about 1.20:1 and wherein said composition is substantially free of any organic compound having a boiling point of at least 338K: and (b) from about 5 to about 70 mole percent based on component (a) and (b) of carbon dioxide.

Surprisingly, this invention provides for the use of combinations of low boiling point organic compounds with high boiling point organic compounds as blowing agent to provide polyurethane foams with overall acceptable physical properties, including improved dimensional stability. The combination of a high boiling point and a low boiling point blowing agent are not normally employed for the preparation of rigid, closed-celled, polyisocyanate-based foam.

A further advantage is that in certain embodiments of this invention can also allow for the production of foam with good dimensional stability that contains reduced quantities of, or no "hard" CFC.

Detailed Description of the Invention

In this invention, a particular blowing agent composition is employed to prepare a blown, closed-celled polyisocyanate-based foam.

The blowing agent composition is characterized in that it comprises as a first component, at least one organic compound having a boiling point of at least about 283K at atmospheric pressure. As a second component, the blowing agent composition comprises at least one organic compound having a boiling point less than or equal to about 266K at atmospheric pressure. The first component comprises from about 40 to about 95 percent of the moles of the first and second components and the second component from about 5 to about 60 percent of the moles of the first and second components. The blowing agent composition is further characterized in that the ratio of the atmospheric boiling points of a said first component to a said second component is from about 1.06:1 to about 1.20:1, and in that the composition is substantially free of any organic compound having a boiling point of at least 338K.

As stated hereinabove, the first component having an atmospheric boiling point of at least about 283K, preferably at least about 288K, comprises at least 40 mole percent of the total moles of the first and second components of the mixture. The blowing agent composition comprises the first component up about 95, preferably up to about 80, more preferably up to about 65 and most preferably up to about 55 mole percent by total moles of the first and second components of the mixture.

The second component of the blowing agent composition having an atmospheric boiling point less than or equal to about 266K but greater than or equal to 235K, preferably at least 240K and more preferably at least 248K. The blowing agent composition comprises the second component in at least about 5, preferably at least about 20, more preferably at least about 35 and most preferably at least about 45 and up to about 60 mole percent of the total moles of the first and second components.

Additionally, the blowing agent composition employed in this invention is substantially free of organic compounds having boiling points of at least 338K, and preferably at least 333K. By "substantially free" it is understood that the boiling agent composition contains less than 5 mole percent by total moles of the first and second components of such high boiling organic compounds. Preferably, such high boiling organic compounds are present in less than about 3 mole percent, more preferably less than about 1 mole percent and most preferably are absent from the blowing agent composition.

As stated hereinabove, the ratio of atmospheric boiling points of a compound belonging to the first component with respect to a compound belonging to the second component advantageously is from about 1.06:1 to about 1.20:1, preferably from about 1.08:1 to about 1.18:1, more preferably from about 1.11:1 to about 1 18:1. Although blowing agent compositions wherein the boiling point ratios of the first to the second component are larger may be used, it is found advantageous for reasons of handling and processing in the manufacturing stages of the foam to remain within these limits.

The first and second components of the blowing agent composition are organic compounds. Organic compounds which are suitable for use in this invention are those which are essentially inert under the conditions employed when preparing a polyurethane foam, but have boiling points of such that if not gaseous at room temperature, can be readily volatilized by the reaction exotherm. Typically, such organic compounds are hydrocarbons including alkanes, alkenes, cycloalkanes and cycloalkenes: alkyl alkanoates such as methyl formate; and halocarbons such as fluorocarbons, chlorofluorocarbons, bromofluorocarbons, perfluorocarbons and non-fluorine-containing compounds. Advantageously, the halocarbon compounds contain at least one hydrogen atom on their carbon backbone. The presence of such a hydrogen atom renders the halocarbon more readily degradable in the environment thus preventing the large accumulation of such compounds.

To provide polyurethane foam with commercially interesting insulation properties, the organic compounds when in a gaseous phase advantageously exhibit gas thermal conductivities of less than about 20, preferably less than about 15, more preferably less than about 13 and most preferably less than about 12 mW/MK at 298K.

In the case of the first component of the blowing agent composition, preferred organic compounds are the halocarbons. Suitable halocarbons include the halocarbons of methane, ethane, and mixtures thereof. Exemplary of methane halocarbons are trichlorofluoromethane (R-11), trichloromethane (R-20), dichlorofluoromethane (R-21), bromodichlorofluoromethane (R-11B1), dibromodifluoromethane (R-12B2), bromochlorofluoromethane (R-21B1), bromofluoromethane (R-31B1) and dichloromethane (R-30); and of the ethane halocarbons are trifluorotrichloroethane (R-113), dibromotetronfluoroethane (R-114B2), dichlorotrifluoroethane (R-123), dichlorodifluoroethane (R-132$b$), trifluorochloroethane (R-133), fluorodichloroethane (R-141$b$) and difluoroethane (R-152). Particularly preferred halocarbons for use as the first component are the methane halocarbons R-11, R-31B1, and the ethane halocarbons R-123, R-133, and R-141$b$ and with especially R-11, R-123, and R-141$b$ being preferred, due to their commercial availability and suitability for preparing polyurethanes.

In the case of the second component of the blowing agent composition, suitable organic compounds are those hydrocarbons and halocarbons having a boiling point at atmospheric pressure equal to or less than about 266K. Preferred organic compounds are the halogenated adducts, halocarbons, of methane, ethane, propane, ethylene, propylene, or cyclic hydrocarbons: and mixtures thereof.

Exemplary of methane halocarbons are dichlorodifluoromethane (R-12), difluoroohloromethane (R-22), chlorofluoromethane (R-31), methylchloride (R-40), bromochlorodifluoromethane (R-12B1), and bromodifluoromethane (R-22B1); of ethane halocarbons are chloropentafluoroethane (R-115), chlorotetrafluoroethane (R-124 or isomer R-124$a$), tetrafluoroethane (R-134 or isomer R-134$a$), chlorodifluoroethane (R-142$b$), trifluoroethane (R-143), difluoroethane (R-152$a$) and fluoroethane (R-161); of propane halocarbons are chloroheptafluoropropane (R-217), octafluoropropane (R-218), heptafluoropropane (R-227$a$), hexafluoropropane (R-236), and pentafluoropropane (R-245$d$): of ethylene halocarbons are chlorotrifluoroethylene (R-1113), chlorodifluoroethylene (R-1122), trans-chlorofluoroethylene (R-1131), gem-chlorofluoroethylene (R-1131$a$), difluoroethylene (R-1132) and chloroethylene (R-1140): of propylene halocarbons are hexafluoropropylene (R-2116$a$), pentafluoropropylene (R-2125$a$), tetrafluoropropylene (R-2134$a$), and difluoropropylene (R-2152$b$): and of cyclic halocarbons are hexafluorocyolopropane (C-216) and octafluorocyclobutane (C-318). Particularly preferred for the second component are the methane halocarbons comprising R-31 and R-22B1 and the ethane halocarbons comprising R-124, R-124$a$, R-134, R-134$a$ and R-142$b$; with R-142$b$ being the most preferred second component.

Particularly preferred blowing agent compositions for use in preparing polyurethane foams are those where component (a) comprises trichlorofluoromethane (R-11), dichlorofluoroethane (R-141$b$), dichlorotrifluoroethane (R-123) or mixtures thereof and where component (b) is 1-chloro-1,1-difluoroethane (R-142$b$).

Especially preferred blowing agent compositions are wherein both component (a) and component (b) comprise one or more ethane halocarbons.

When preparing polyurethane foams by the process of this invention, optionally, but advantageously there is present, in addition to the blowing agent composition, a blowing agent precursor. The blowing agent precursor is a substance which during the course of the polymerization reaction undergoes conversion and provides a gas. The so-provided gas functions as a blowing agent in addition to the blowing agent composition.

The blowing agent precursor can provide the gas through chemical reaction with itself, or with one or more components or intermediates of the polymerizing reaction mixture. Alternatively, the blowing agent precursor can provide the gas as a consequence of being thermally unstable on exposure to the reaction exotherm.

Illustrative of a blowing agent precursor which provides a gas by chemical reaction is, for example, water. Water reacts with organic polyisocyanates to provide carbon dioxide. Exemplary of blowing agent precursors which provide a gas through thermal instability are pecan flour and the amine/carbon dioxide complexes such as taught in U.S. Pat. Nos. 4,735,970 and 4,500,656, and alkyl alkanoate compounds described by U.S. Pat. No. 3,879,315, all herein incorporated by reference.

The gas provided by a blowing agent precursor is frequently carbon dioxide. But, in the case of substances which are thermally unstable it may also be other gaseous compounds or elements such as nitrogen, air or fluorinated hydrocarbons.

When a blowing agent precursor is present in the process of this invention, preferably it is one which provides carbon dioxide; especially preferred for this purpose is water. Theoretically, one mole of water when reacted with an excess of organic polyisocyanate provides one mole of carbon dioxide.

Polyurethane foams are prepared by reacting at least one organic polyisocyanate with at least one active hydrogen-containing compound in the presence of the blowing agent composition described hereinabove. It is often convenient to preblend the blowing agent composition with the active hydrogen-containing compound before contacting the resulting blend with the polyisocyanate. Preferably, the blowing agent composition is prepared in the active hydrogen-containing compound. It is also possible to simultaneously blend together the polyisocyanate, active hydrogen-containing compound and blowing agent composition in one operation resulting in the production of polyurethane foam.

The quantity of blowing agent composition employed when preparing a foam is sufficient to give a desired density to the foam. Advantageously, sufficient blowing agent is employed to provide a polyurethane foam having a free-rise density of from about 10 to about 500, preferably from about 15 to about 200, more preferably from about 18 to about 100 and most preferably from about 18 to about 60 kg/m$^3$.

When preparing blends of at least one active hydrogen-containing compound with the blowing agent composition, to achieve the desired overall density of polyurethane foam, the blend advantageously contains at least one, preferably at least 2 and up to 30, preferably up to 25 and more preferably up to 20 weight percent of the blowing agent composition by total weight of active hydrogen-containing compound and blowing agent composition.

Active hydrogen-containing compounds which are useful in the preparation of polyisocyanate-based cellular polymers include those materials having two or more groups which contain an active hydrogen atom which reacts with an isocyanate, such as is described in U.S. Pat. No. 4,394,491, incorporated herein by reference. Preferred among such compounds are materials having at least two hydroxyl, primary or secondary amine, carboxylic acid, or thiol groups per molecule. Polyols, i.e., compounds having at least two hydroxyl groups per molecule, are especially preferred due to their desirable reactivity with polyisocyanates.

Suitable isocyanate reactive materials for preparing rigid polyurethanes include those having an equivalent weight of about 50 to about 700, preferably about 70 to about 300 and more preferably about 70-150. Such isocyanate-reactive materials also advantageously have a functionality of at least 2, preferably about 3, up to about 16, preferably up to about 8, active hydrogen atoms per molecule.

Suitable additional isocyanate-reactive materials include polyether polyols, polyester polyols, polyhydroxy-terminated acetal resins, hydroxyl-terminated amines and polyamines, and the like. Examples of these and other suitable isocyanate-reactive materials are described more fully in U.S. Pat. No. 4,394,491, particularly in columns 3–5 thereof. Most preferred for preparing rigid foams, on the basis of performance, availability and cost, is a polyol prepared by adding an alkylene oxide to an initiator having from about 2 to about 8, preferably about 3 to about 8 active hydrogen atoms. Exemplary of such polyols include those commercially available under the trade name VORANOL ® (trademark of The Dow Chemical Company), such as VORANOL 202, VORANOL 360, VORANOL 370, VORANOL 446, VORANOL 490, VORANOL 575, VORANOL 640, VORANOL 800, all sold by The Dow Chemical Company, and PLURACOL ® 824, sold by BASF Wyandotte. Other most preferred polyols include alkylene oxide derivatives of Mannich condensates, as taught, for example, in U.S. Pat. Nos. 3,297,597; 4,137,265 and 4,383,102, incorporated herein by reference, and aminoalkylpiperazine-initiated polyethers as described in U.S. Pat. Nos. 4,704,410 and 4,704,411, incorporated herein by reference.

Polyisocyanates useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4′-diisocyanate, diphenylmethane-2,4′-diisocyanate, 4,4′-biphenylenediisocyanate, 3,3′-dimethoxy-4,4′-biphenylenediisocyanate and 3,3′-dimethyldiphenylpropane-4,4′-diisooyanate: triisocyanates such as toluene-2,4,6-triisocyanate and polyisocyanates such as 4,4′-dimethyldiphenylmethane-2,2′,5′,5′-tetraisocyanate and the diverse polymethylenepolyphenylpolyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred are methylene-bridged polyphenylpolyisocyanates, due to their ability to cross-link the polyurethane. The isocyanate index (ratio of equivalents of isocyanates to equivalents of active hydrogen-containing groups) is advantageously from about 0.9 to about 10, preferably about 1.0 to about 4.0, more preferably about 1.0 to about 1.5.

In addition to the foregoing critical components, it is often desirable to employ certain other ingredients in preparing cellular polymers. Among these additional ingredients are catalysts, surfactants, flame retardants, preservatives, colorants, antioxidants, reinforcing agents, and fillers.

A rigid closed-celled polyisocyanate-based foam is prepared by contacting and reacting an organic polyisocyanate with an active hydrogen-containing compound in the presence of the above-described blowing agent composition and optional blowing agent precursor. The foam when prepared advantageously contains within its closed cells a gaseous mixture comprising the above-described blowing agent composition and any gas derived from a blowing agent precursor.

As already stated hereinabove, a preferred blowing agent precursor is water, providing carbon dioxide. The quantity of water used in addition to the blowing agent composition is sufficient to provide a rigid closed-celled polyisocyanate-based foam containing in its cells a gaseous mixture comprising (a) from about 30 to about 95 mole percent based on component (a) and component (b) of a mixture comprising;
 (1) from about 40 to about 95 mole percent based on components (1) and (2) of at least one organic compound having a boiling point of at least about 283K, and
 (2) from about 5 to about 60 mole percent based on components (1) and (2) of at least one organic compound having a boiling point less than or equal to about 266K, and wherein the ratio of said boiling point of a component (1) to a component (2) is from about 1.06:1 to about 1.20:1 and wherein said composition is substantially free of any organic compound having a boiling point of at least 338K, and
(b) from about 5 to about 70 mole percent based on components (a) and (b) of carbon dioxide.

Advantageously, component (a) of the cell gas mixture represents at least about 30, preferably at least about 40, more preferably at least about 50, and most preferably at least about 55, and up to about 95, preferably up to about 85 and more preferably up to about 75 mole percent based on components (a) and (b) of the mixture.

Component (b) of the cell gas mixture, in this case carbon dioxide, represents at least about 5, preferably at least about 15, more preferably at least about 25, and up to about 70, preferably up to about 60, more preferably up to about 50 and most preferably up to about 45 mole percent based on components (a) and (b) of the mixture. Although foams can be prepared with cell gas compositions outside these limits, the resulting foams may not exhibit commercially desirable physical properties.

Other auxiliaries useful in producing polyurethanes include surfactants, pigments, colorants, fillers, fibers, antioxidants, catalysts, flame retardants, stabilizers and the like. In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by weight polyol are sufficient for this purpose.

One or more catalysts for the reaction of the polyol (and water, if present) with the polyisocyanate are advantageously used. Any suitable urethane catalyst may be used, including tertiary amine compounds and organometallic compounds. Exemplary tertiary amine compounds include triethylenediamine, N-methyl morpholine, pentamethyldiethylenetriamine, tetramethylethylenediamine, 1-methyl-4-dimethylaminoethylpiperazine, 3-methoxy-N-dimethylpropylamine, N-ethyl morpholine, diethylethanolamine, N-coco morpholine, N,N-dimethyl-N', N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, alkali metal carboxylate, or quaternary amine compound, may also optionally be employed herein. Such catalysts are used in an amount which measurably increases the rate of reaction of the polyisocyanate. Typical amounts are about 0.001 to about 2 parts of catalyst per 100 parts by weight of polyol.

In making a polyurethane foam, the polyol(s), polyisocyanate and other components are contacted, thoroughly mixed and permitted to expand and cure into a cellular polymer. The particular mixing apparatus is not critical, and various types of mixing head and spray apparatus are conveniently used. It is often convenient, but not necessary, to preblend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to pre-react all or a portion of the polyol(s) with the polyisocyanate to form a prepolymer, although such is not preferred.

The polyurethane foam of this invention is useful in a wide range of applications, such as in spray insulation, appliance foam, rigid insulating boardstock, laminates, and many other types of rigid foam.

Illustrative Embodiments

The following examples are given to illustrate the invention and should not be interpreted as limiting it in any way. Unless stated otherwise, all parts and percentages are given by weight.

EXAMPLE 1 TO 7

Rigid polyurethane foams according to the invention are prepared from the formulations described below in Table I. The foams are prepared using a Zaco low pressure foaming machine equipped with a high shear mixer set to 7000 rpm.

B.A. - I (Blowing Agent - I) is trichlorofluoromethane (R - 11) boiling point 296.8K B.A. - II is 1-chloro-1,1-difluoroethane boiling point 263.8K (R-142b)

Boiling point ratio 296.8K/263.8K is equal to 1.125

The properties of the resulting foams are shown in Table II.

TABLE I

| Sample | A* | 1 | 2 | B* | 3 | 4 | C* | 5 | D* | 6 | 7 |
|---|---|---|---|---|---|---|---|---|---|---|---|
| Polyol A (parts) | 98.2 | 98.2 | 98.2 | 98.2 | 98.2 | 98.2 | 98.2 | 98.2 | 99.2 | 99.2 | 63.0 |
| Polyol B | — | — | — | — | — | — | — | — | — | — | 33.0 |
| B.A.-I | 37.5 | 27.5 | 16.3 | 31.8 | 28.8 | 17.1 | 26.8 | 11.9 | 43.3 | 26.3 | 10.3 |
| (parts/mole %) | | (75) | (45) | | (90) | (55) | | (46) | | (62) | (76.6) |
| B.A.-II | — | 6.9 | 14.6 | — | 2.2 | 10.3 | — | 10.3 | — | 11.8 | 2.3 |
| (parts/mole %) | | (25) | (55) | | (10) | (45) | | (54) | | (38) | (23.4) |
| Total Water (parts) | 1.8 | 1.8 | 1.8 | 2.8 | 2.8 | 2.8 | 3.8 | 3.8 | 0.8 | 0.8 | 4.2 |
| Isocyanate** (parts) | 140.5 | 140.5 | 140.5 | 156.3 | 156.3 | 156.3 | 174 | 174 | 126.1 | 126.1 | 16.3 |
| % reduction in R-II requirement over Sample A | — | 26.7 | 56.5 | 15.2 | 23.2 | 54.4 | 28.5 | 68.3 | — | 29.8 | 72.5 |

*Not an example of this invention
**A Crude polyphenyl polymethylene polyisocyanate, average functionality 2.7 average, NCO equivalent weight 137
Polyol A - a polyol formulation containing propoxylated sucrose, glycerine and ethylene diamine polyols, surfactant and catalyst, average functionality 4.0, hydroxyl number 460. The polyol formulation is available commercially as VORANOL RST 460 sold by The Dow Chemical Company containing the 1.8 parts water indicated separately in this table.
Polyol B - propoxylated diol, hydroxyl number 110.

TABLE II

| | Foam Properties | | | | | | | | | | |
|---|---|---|---|---|---|---|---|---|---|---|---|
| | A* | 1 | 2 | B* | 3 | 4 | C* | 5 | D* | 6 | 7 |
| Theoretical cell gas composition (Mole %) | | | | | | | | | | | |
| B.A. - I | 73.2 | 54.3 | 32.6 | 59.8 | 54.3 | 32.6 | 48.0 | 21.7 | 87.7 | 54.3 | 7.0 |

TABLE II-continued

| | A* | 1 | 2 | B* | 3 | 4 | C* | 5 | D* | 6 | 7 |
|---|---|---|---|---|---|---|---|---|---|---|---|
| Foam Properties | | | | | | | | | | | |
| B.A. - II | — | 18.6 | 40.0 | — | 5.5 | 26.7 | — | 25.5 | — | 33.1 | 23.0 |
| $CO_2$ | 26.8 | 27.1 | 27.4 | 40.2 | 40.2 | 40.7 | 52.0 | 52.8 | 12.3 | 12.6 | 70.0 |
| Reactivity (secs) | | | | | | | | | | | |
| cream time | 8 | 6 | 3 | 6 | 7 | 3 | 8 | 5 | 11 | 2 | 4 |
| gel time | 64 | 67 | 69 | 48 | 54 | 53 | 43 | 42 | 84 | 100 | 39 |
| tack free time | 90 | 83 | 87 | 64 | 71 | 73 | 60 | 55 | 99 | 108 | 62 |
| Density (free-rise) $Kg/M^3$ | 21.3 | 21.2 | 21.1 | 20.1 | 20.5 | 20.6 | 20.5 | 20.0 | 22.7 | 20.5 | 22.7 |
| Density Distribution | 0.53 | 0.68 | 1.17 | 0.80 | 0.70 | 1.33 | 1.25 | 2.07 | 0.62 | 0.84 | 0.35 |
| Height/Weight cm/g | 1.29 | 1.28 | 1.23 | 1.36 | 1.33 | 1.23 | 1.30 | 1.09 | 1.16 | 1.25 | — |
| Post Demold Expansion (mm) | | | | | | | | | | | |
| 3 min/10 min | 12.3 | 10.7 | 11.1 | 12.7 | 12.4 | 12.0 | 11.7 | 12.0 | 14.7 | 14.7 | 5.7 |
| 3 min/24 hr | 9.5 | 8.7 | 9.1 | 9.7 | 10.1 | 10.2 | 9.8 | 10.3 | 12.6 | 12.6 | −2.3 |
| 4 min/10 min | 9.2 | 8.7 | 8.3 | 8.7 | 8.7 | 8.8 | 8.8 | 9.5 | 10.2 | 10.2 | 3.3 |
| 4 min/24 hr | 6.4 | 6.1 | 5.8 | 6.5 | 6.4 | 6.8 | 6.6 | 6.5 | 7.6 | 7.6 | −4.5 |
| Comp. Strength (KPa) | | | | | | | | | | | |
| (∥) | 116 | 111 | 112 | 118 | 132 | 124 | 150 | 133 | 180 | 149 | 150 |
| (⊥) | 68 | 70 | 73 | 85 | 84 | 81 | 73 | 74 | 95 | 85 | — |
| K-Factor (mW/MK) | | | | | | | | | | | |
| (∥) | 20.3 | 22.3 | 22.5 | 21.1 | 21.1 | 22.8 | 21.0 | 24.4 | 21.5 | 24.1 | — |
| (⊥) | 18.3 | 19.8 | 20.3 | 18.9 | 19.3 | 21.2 | 19.4 | 22.5 | 18.4 | 21.2 | 21.6 |

*Not an example of the invention
(∥)parallel to rise direction
(⊥)perpendicular to rise direction The height/weight measurements and density distribution data are obtained using a 200×4×6 cm mold preheated to 45° C. The larger the height/weight value the better the flow of the reacting system. The density distribution is a statistical analysis of the foam density obtained when the mold has been overpacked by 10 percent the lower the value the smaller the deviation in foam density overall.

Post Demold expansion is measured in millimeters in the parallel-to-rise direction on 20×20×20 cm cube foam, molded to an overall density of about 30 kg/m³. The expansion is observed after a curing time of 10 minutes and then 24 hours, with one face of the mold having initially been opened after 3 or 4 minutes curing. Lower values of expansion indicate improved demold performance. Compressive strengths are measured in the parallel-to-rise and perpendicular-to-rise directions using 5×5×5 cm cubes obtained from the core of the larger molded cubes.

K-factor is measured on molded foam, having an overall density of about 30 kg/m³, cut to approximately 2.5×18×18 cm. K-factor performance is observed in both perpendicular and parallel-to-rise directions. An Anacon Model 88, Thermal Conductivity Analyzer with cold and hot plate temperatures of 10.2 and 37.8° C. was employed.

EXAMPLES 8 AND 9

Rigid polyurethane foams which contain no "hard" CFCs are prepared as for Examples 1 to 7 according to the formulations give in Table III. Foam properties are reported in Table IV.

B.A. - III is dichlorotrifluoroethane (R-123) boiling point 300.1K
B.A. - IV is dichlorofluoroethane (R-141b) boiling point 305K
B.A. - II as for Examples 1–6
Boiling point ratio: B.A. - III/B.A. - II is 1.138 B.A. - IV/B.A. - II is 1.156

TABLE III
(Examples 8 and 9)

| | 8 | 9 |
|---|---|---|
| Polyol A* (parts) | 98.2 | 98.2 |
| B.A. - III parts (mole %) | 20.5 (50%) | — |
| B.A. - IV | — | 15.2 (50%) |
| B.A. - II | 13.4 (50%) | 13.1 (50%) |
| Total Water (parts) | 1.8 | 1.8 |
| Isocyanate** (parts) | 142.1 | 142.1 |
| % R-11 reduction over Sample A | 100% | 100% |

Polyol A* - a polyol formulation containing propoxylated sucrose, glycerine and ethylene diamine polyols; average functionality 4.0, hydroxyl number 460. The polyol formulation is available commercially as VORANOL RST 460 sold by The Dow Chemical Company containing the 1.8 parts water indicated separately in this table.
** A Crude polyphenyl polymethylene polyisocyanate, average functionality, 2.7 average NCO equivalent weight 137

TABLE IV
(Examples 8 and 9)

| | 8 | 9 |
|---|---|---|
| Theoretical cell gas composition (mole %) | | |
| B.A. - III | 36.4 | — |
| B.A. - IV | — | 36.1 |
| B.A. - II | 36.4 | 36.1 |
| $CO_2$ | 27.1 | 27.7 |
| Reactivity (secs) | | |
| cream time | 6 | 6 |
| gel time | 84 | 74 |
| tack free time | 102 | 95 |
| Density (free-rise) $Kg/M^3$ | 22.4 | 23.1 |
| Density Distribution | 1.24 | 0.79 |
| Height/Weight cm/g | 1.05 | 1.15 |
| Post Demold Expansion (mm) | | |
| 3 min/10 min | 3.2 | 8.2 |
| 3 min/24 hr | 1.7 | 5.1 |
| 4 min/10 min | 1.5 | 6.8 |
| 4 min/24 hr | 0.1 | 3.9 |
| Comp. Strength (KPa) | | |
| (∥) | 115 | 121 |
| (⊥) | 71 | 60 |
| K-Factor (mW/MK) | | |
| (∥) | 25.7 | 23.8 |

TABLE IV-continued (Examples 8 and 9)

|  | 8 | 9 |
|---|---|---|
| (⊥) | 22.2 | 20.8 |

(∥) - parallel to rise direction
(⊥) - prependicular to rise direction

The dimension stability of Samples 1 to 8 and A to D is observed on foams prepared under free-rise conditions. The dimensional stability is observed at −30° C. and +110° C.

Table V indicates the observed dimensional stability at −30° C., Table VI at +110° C. The figures given are the overall percentage volume change of, 5×5×5 cubes taken from the center of a free-rise cube, foam having dimensions 20×20×20.

TABLE V (Dimensional Stability at −30° C.)
(% Volume Change) for Samples 1-9 and A-D

| Days | A* | 1 | 2 | B* | 3 | 4 | C* | 5 | D* | 6 | 7 | 8 | 9 |
|---|---|---|---|---|---|---|---|---|---|---|---|---|---|
| 1 | 0 | 0 | 0 | 0 | 0 | 0 | 0 | 0 | 0 | 0 | 0 | 0 | 0 |
| 2 | −3.1 | −0.2 | +1.5 | −2.7 | +0.8 | −0.2 | −6.2 | −6.7 | −49.7 | −37.4 | −0.1 | +0.3 | +0.4 |
| 8 | −18.5 | −1.8 | 0 | −23.4 | −4.2 | −1.0 | −26.6 | −17.0 | −51.9 | −36.3 | 0 | +0.2 | +0.2 |
| 15 | −33.9 | −5.9 | −0.6 | −30.4 | −10.6 | −1.6 | −31.4 | −22.7 | −43.9 | −36.5 | −0.3 | 0** | +0.8** |
| 29 | −25.2 | −17.0 | −1.6 | −42.4 | −26.6 | −2.0 | −37.4 | −31.7 | −50.3 | −38.2 | — | +0.6 | −0.2 |

*Not an example of the invention
**Dimensional stability observed after 12 days

TABLE VI (Dimensional Stability at +110° C.)
(% Volume Change) for Samples 1-9 and A-D

| Days | A* | 1 | 2 | B* | 3 | 4 | C* | 5 | D* | 6 | 7 | 8 | 9 |
|---|---|---|---|---|---|---|---|---|---|---|---|---|---|
| 1 | 0 | 0 | 0 | 0 | 0 | 0 | 0 | 0 | 0 | 0 | 0 | 0 | 0 |
| 2 | +2.0 | +1.4 | +1.4 | +0.4 | +0.5 | +0.2 | −1.2 | −3.1 | +6.6 | +4.8 | +0.5 | 0 | +1.6 |
| 8 | +4.4 | +1.0 | +3.2 | +1.8 | +1.6 | +1.1 | +0.4 | −2.6 | +14.0 | +10.0 | +1.8 | +2.3 | +3.3 |
| 15 | +5.6 | +5.1 | +5.8 | +4.5 | +2.6 | +4.1 | +4.0 | +4.6 | +14.0 | +11.5 | +1.6 | +3.3** | +5.6** |
| 29 | +8.7 | +7.4 | +6.8 | +5.3 | +5.0 | +4.3 | +3.1 | +5.7 | +16.7 | +10.4 | — | +6.5 | +7.4 |

*Not an example of the invention
**Dimensional stability observed after 12 days

As can be seen from the data in Tables II and IV foams with acceptable physical properties can be produced according to this invention.

Tables V and VI illustrate the greatly improved dimensional stability to be obtained from foams prepared according to this invention. Especially significant is the dimensional stability of Samples 2, 4, 8 and 9 at −30° C. with respect to the comparative samples A and B, combined with the significant or total reduction of "hard" CFC content of the foam.

What is claimed is:

1. A process for preparing a rigid closed-celled polyisocyanate-based foam by reacting at least one organic polyisocyanate with at least one active hydrogen-containing compound in the presence of a blowing agent composition characterized in that the composition comprises:
   (a) from about 40 to about 95 mole percent based on components (a) and (b) of at least one organic compound having a boiling point of at least about 283K, and
   (b) from about 5 to about 60 mole percent based on components (a) and (b) of at least one organic compound having a boiling point less than or equal to about 266K, and wherein the ratio of the said boiling point of a component (a) to a component (b) is from about 1.06:1 to about 1.20:1 and wherein the said composition is substantially free of any organic compound having a boiling point of at least 338K.

2. The process of claim 1 wherein the foam is prepared in the presence of a blowing agent precursor.

3. The process of claim 2 wherein component
   (a) is present in from about 40 to about 80 mole percent based on components (a) and (b).

4. The process of claim 3 wherein component
   (a) is present in from about 40 to about 65 mole percent based on components (a) and (b).

5. The process of claim 3 wherein component
   (b) is present in from about 20 to about 60 mole percent based on components (a) and (b).

6. The process of claim 4 wherein component
   (b) is present in from about 35 to about 60 mole percent based on components (a) and (b).

7. The process of claim 2 wherein components (a) and (b) each have a gas thermal conductivity of less than about 15 mW/MK at 298K.

8. The process of claim 7 wherein components (a) and (b) are each a halocarbon.

9. The process of claim 8 wherein the halocarbon of component (a) comprises one or more methane halocarbons, ethane halocarbons or mixtures thereof.

10. The process of claim 8 wherein the halocarbon of component (b) comprises one or more methane-, ethane-, propane-, ethylene-, propylene-, or cyclic-halocarbons, or mixtures thereof.

11. The process of claim 10 wherein component (a) comprises one or more ethane halocarbons and component (b) comprises one or more ethane halocarbons.

12. The process of claim 2 wherein the blowing agent precursor is a substance which on conversion provides a gas.

13. The process of claim 12 wherein the substance is water which provides carbon dioxide.

14. The process of claim 13 wherein a polyisocyanate-based foam is prepared in the presence of a blowing agent composition comprising component (a) which is one or more ethane halocarbons, component (b) which is one or more ethane halocarbons, and a blowing agent precursor which is water.

15. A process for preparing a rigid closed-celled polyisocyanate-based foam by reacting at least one organic polyisocyanate with at least one active hydrogen-containing compound in the presence of a blowing agent composition characterized in that the composition comprises:

(a) from about 40 to about 95 mole percent based on components (a) and (b) of one or more compounds selected from the group consisting of trichlorofluoromethane (R-11), trichloromethane (R-20), dichlorofluoromethane (R-21), bromodichlorofluoromethane (R-11B1), dibromodifluoromethane (R-12B2), bromochlorofluoromethane (R-21B1), bromofluoromethane (R-31B1), dichloromethane (R-30), trifluorotrichloroethane (R-113), dichlorotrifluoroethane (R-123), dichlorodifluoroethane (R-132b), trifluorochloroethane (R-133), fluorodichloroethane (R-141b), and difluoroethane (R-152): and (b) from about 5 to about 60 mole percent based on components (a) and (b) of one or more compounds selected from the group consisting of chlorofluoromethane (R-31), bromochlorodifluoromethane (R-12B1), and bromodifluoromethane (R-22B1), chloropentafluoroethane (R-115), chlorotetrafluoroethane (R-124 or isomer R-124a), tetrafluoroethane (R-134 or isomer R-134a), chlorodifluoroethane (R-142b), trifluoroethane (R-143), difluoroethane (R-152a), fluoroethane (R-161), hexafluorocyclopropane (C-216) and octafluorocyclobutane (C-318);

and wherein said composition is substantially free of any organic compound having a boiling point of at least 338K.

16. The process of claim 15 wherein the foam is prepared in the presence of a blowing agent precursor.

17. The process of claim 16 wherein component (a) is present in from about 40 to about 80 mole percent based on components (a) and (b).

18. The process of claim 17 wherein component (a) is present in from about 40 to about 65 mole percent based on components (a) and (b).

19. The process of claim 18 wherein component (b) is present in from about 20 to about 60 mole percent based on components (a) and (b).

20. The process of claim 18 wherein component (b) is present in from about 35 to about 60 mole percent based on components (a) and (b).

21. The process of claim 16 wherein component (a) is one or more compounds selected from the group consisting of trichlorofluoromethane (R-11), bromofluoromethane (R-31B1), dichlorotrifluoroethane (R-123), trifluorochloroethane (R-133), and fluorodichloroethane (R-141b): and component (b) is one or more compounds selected from the group consisting of chlorofluoromethane (R-31), bromodifluoromethane (R-22B1), chlorotetrafluoroethane (R-124 or isomer R-124a), tetrafluoroethane (R-134 or isomer R-134a), and chlorodifluoroethane (R-142b).

22. The process of claim 21 wherein component (a) is trichlorofluoromethane (R-11) and component (b) is chlorodifluoroethane (R-142b).

23. The process of claim 21 wherein component (a) is fluorodichloroethane (R-141b) and component (b) is chlorodifluoroethane (R-142b).

24. The process of claim 21 wherein component (a) is dichlorotrifluoroethane (R-123) and component (b) is chlorodifluoroethane (R-142b).

25. The process of claim 16 wherein the blowing agent precursor is a substance which on conversion provides a gas.

26. The process of claim 25 wherein the substance is water which provides carbon dioxide.

27. A composition comprising a blend of at least one active hydrogen-containing compound and from about 1 to about 50 weight percent of total weight of the blend a blowing agent composition comprising:

(a) from about 40 to about 95 mole percent based on components (a) and (b) of at least one organic compound having a boiling point of at least about 283K, and (b) from about 5 to about 60 mole percent based on components (a) and (b) of at least one organic compound having a boiling point less than or equal to about 272K, and wherein the ratio of said boiling point of a component (a) to a component (b) is from about 1.06:1 to about 1.20:1 and wherein the said composition is substantially free of any organic compound having a boiling point of at least 338K.

28. A blown, rigid closed-celled polyisocyanate-based foam containing in its cells a gaseous mixture comprising:

(a) from about 30 to about 95 mole percent based on component (a) and component (b) of a mixture comprising:

(1) from about 40 to about 95 mole percent based on components (1) and (2) of at least one organic compound having a boiling point of at least about 283K, and (2) from about 5 to about 60 mole percent based on components (1) and (2) of at least one organic compound having a boiling point less than or equal to about 266K, and wherein the ratio of the said boiling points of component (1) to component (2) is from about 1.06:1 to about 1.20:1 and wherein said composition is substantially free of any organic compound having a boiling point of at least 338K, and (b) from about 5 to about 70 mole percent based on component (a) and (b) of carbon dioxide.

29. The foam of claim 28 wherein improved dimensional stability is exhibited.

* * * * *